United States Patent Office 3,519,472
Patented July 7, 1970

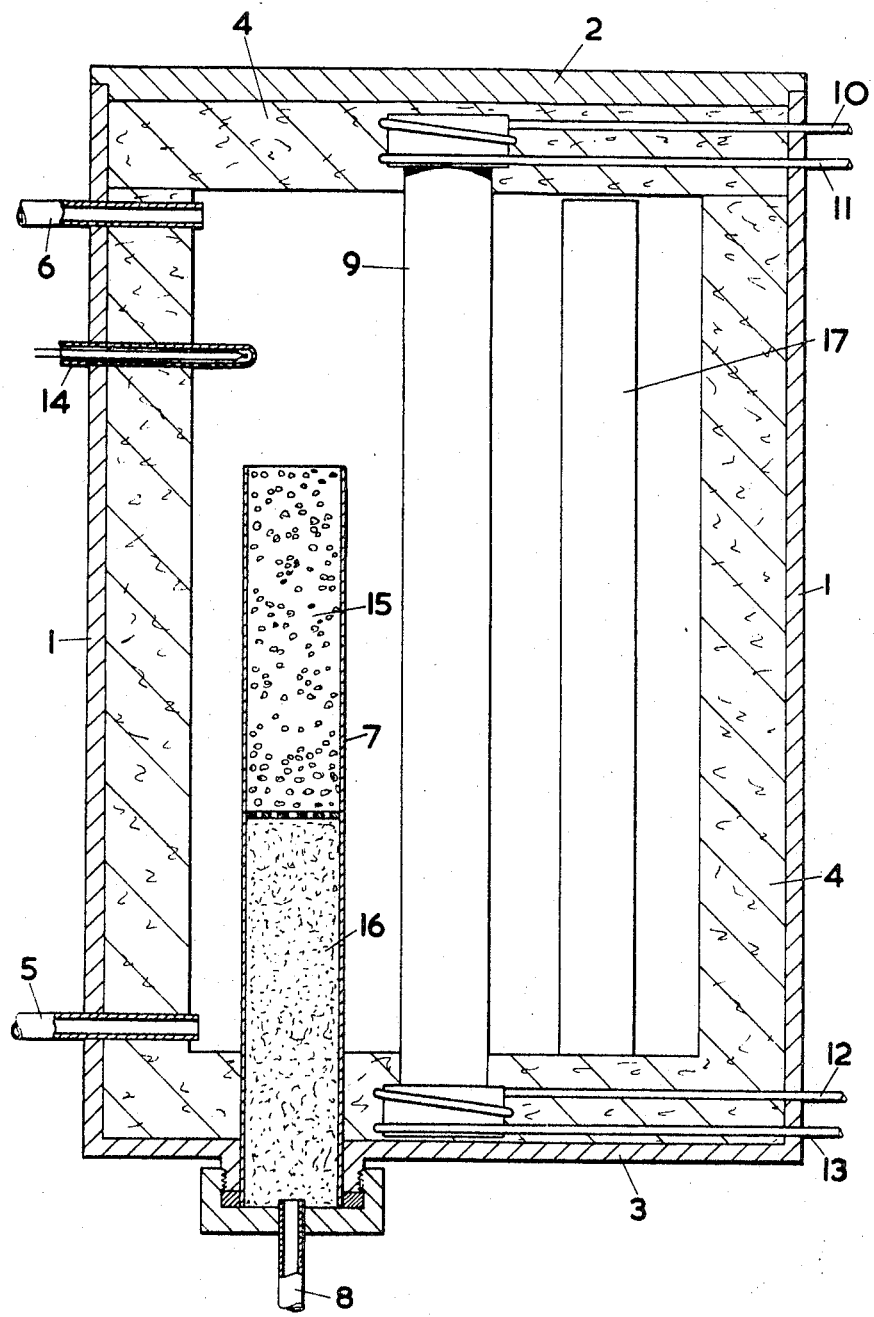

3,519,472
MANUFACTURE OF SILICON CARBIDE
Michael David Cameron Dyne, Great Shelford, and Christopher Charles Evans, Saffron Walden, England, assignors to National Research Development Corporation, London, England
Filed Mar. 28, 1968, Ser. No. 716,937
Claims priority, application Great Britain, Mar. 29, 1967, 14,211/67
Int. Cl. C23c 13/04
U.S. Cl. 117—106                    9 Claims

ABSTRACT OF THE DISCLOSURE

A process for the manufacture of silicon carbide whiskers which comprises reacting at a temperature between about 1200° C. and 1600° C. silicon monoxide vapor and carbon monoxide in the presence of hydrogen and solid-phase carbon, and providing adjacent these reactants a substrate heated to a temperature above about 1200° C. whereby silicon carbide is formed as whiskers upon the surface of the substrate.

---

The invention relates to improvements in the manufacture of silicon carbide in the form of elongated single-crystal fibres known as whiskers. The term whisker is generally applied to any single-crystal fibre having a thickness less than about 0.1 mm. and a length to thickness ratio of at least 10 and normally at least 100.

Silicon carbide whiskers have high stiffness and tensile strength, and excellent thermal stability and these desirable properties make them very attractive as reinforcing materials for incorporation into metal and plastics matrices. The present invention provides silicon carbide whiskers suitable for such reinforcing applications by a readily-controlled reaction between gaseous and vaporous reactants which is not critically affected by minor variations in the reaction conditions.

According to the invention, a process for the manufacture of silicon carbide whiskers comprises reacting at a temperature between about 1200° C. and 1600° C. silicon monoxide vapour and carbon monoxide in the presence of hydrogen and solid-phase carbon, and providing adjacent these reactants a substrate heated to a temperature above about 1200° C. whereby silicon carbide is formed as whiskers upon the surface of the substrate.

Silicon carbide whiskers are believed to be formed in a process in accordance with the invention by the following reaction.

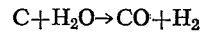

The most favourable proportion of silicon monoxide and carbon monoxide for reaction are thus equimolar proportions. It is essential to carry out the reaction in the presence of at least two molecular proportions of hydrogen (based on the carbon monoxide) and since the whisker forming reaction is not favoured thermodynamically a large excess of hydrogen is preferred. Nevertheless, proportions of reactants differing widely from the preferred proportions may still give useful yields of silicon carbide whiskers.

For optimum growth of whiskers it is desirable to maintain the diffusion paths of gaseous reactants and by-products as short as possible and normally this may be achieved by surrounding the reaction zone with substrate or disposing the substrate within the reaction zone itself.

Solid phase carbon is provided to regenerate carbon monoxide and hydrogen from the steam formed as the by-product of the whisker forming reaction. The regenerated gases may then react once more with silicon monoxide to form further whiskers. The regeneration reaction proceeds as follows:

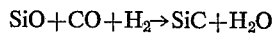

Suitable substrates are those capable of providing nucleating sites for the growth of silicon nitride whiskers. Preferred substrates are refractory materials such as silicon nitride, silicon carbide, alumina, mullite and carbon. Carbon is a particularly convenient substrate material as its presence is already desirable in order to achieve regeneration of the by-product steam as herein before described. The particular form of the solid-phase carbon used is not of major importance and may be for example particulate carbon, a fibrous carbon, or a carbon cloth.

The preferred temperature at which the whisker forming reaction is carried out is about 1450° C. and the preferred substrate temperature is somewhat below this, about 1375° C. Generally the substrate temperature should be 50°–100° C. lower than the temperature at which the reactants are reacted.

The pressure at which the process is carried out conveniently may be atmospheric pressure, but the whisker forming reaction is aided by reducing the pressure considerably below atmospheric.

Silicon monoxide is preferably provided by heating a substantially equimolar mixture of silicon and silica at a temperature of at least 1200° C. as more fully described in U.S. Pat. No. 3,394,991. The evolved silicon monoxide vapour may be flushed into contact with the other reactants employed in a process in accordance with the present invention by a stream of inert gas, such as argon, which does not react significantly with silicon monoxide. Where the silicon carbide whisker forming reaction is carried out at low pressures of the order of the vapour pressure of silicon monoxide i.e. about 10 torr, it may be unnecessary to flush the silicon monoxide vapour from the mixture of silicon and silica because the rate of evaporation of silicon monoxide from the mixture will be adequate.

The process according to the invention is conveniently carried out insde a high-temperature reactor having a heated reaction zone, inlet means for the introduction of the reactants, outlet means for removing gaseous by-products and which contains carbon and a suitable substrate material. A very suitable high-temperature reactor is the furnace described in our French Pat. 1,412,775 and silicon carbide whiskers may be prepared in accordance with the present invention in the furnace described therein substantially in the general manner described with exceptions that hydrogen, rather than nitrogen forms a major component of the total reacting gases and that a small proportion of carbon monoxide is also supplied to the reaction zone.

In a continuous-flow system in which silicon carbide whiskers are formed upon a substrate from reactants continuously flowing into the reaction zone and in which by-product gases are continuously removed from the reaction zone, it is found that the concentration by volume of carbon monoxide in the reaction zone should not exceed that of the silicon monoxide by more than a factor of ten because otherwise silica will be deposited upon the substrate and seriously interfere with the formation of silicon carbide whiskers. The carbon monoxide concentration normally-used in a continuous-flow system is normally considerably below this concentration, generally not exceeding about twice the concentration of silicon monoxide.

It will be appreciated that the regeneration of by-product steam from the process produces carbon monoxide and hydrogen which may be recirculated to the reaction zone with appropriate concentration adjustments, thus making possible a continuous process which, once operating, requires to be further supplied only with silicon monoxide.

The precise mechanism by which silicon carbide whiskers are formed in a process in accordance with the invention is not fully understood but it is believed to be analogous to the mechanism proposed by Wagner and Ellis (Trans. Met. Soc. A.I.M.E., 233, 1053, (1965)) for the formation of silicon whiskers and called by them Vapour-Solid-Liquid (V.L.S.) theory. Briefly, the V.L.S. theory proposes that nucleation of silicon whiskers takes place at the sites of minute concentrations of molten metals or alloys present in the substrate and that the further formation and extension of a whisker outwardly from the substrate takes place in this molten material which is maintained at the tip of the growing whisker. Analysis of silicon carbide whiskers produced by the present invention shows that the majority of whiskers have at the tip a metallic knob comprising an alloy of iron and silicon, sometimes in combination with nickel, titanium and other metals, and this is consistent with a V.L.S. type of whisker formation. Generally, adequate concentrations of such metals would be present inevitably in one or more of the materials used in a process according to the invention, particularly in the refractories used as substrate materials and refractory brick normally used as thermal insulation for the high temperature reactor.

A particular example will now be described of a process for the production of silicon carbide whiskers in accordance with the invention carried out in a high temperature reactor which is the furnace described in U.S. Pat. No. 3,394,991 and with reference to the accompanying drawing.

The furnace comprises an outer casing consisting of cylinder 1 having end faces 2 and 3 and the inner sides of the casing are covered with thermal insulating material 4. Inlet pipe 5 and outlet pipe 6 pass through the wall of the outer casing and allow gases to be passed into, and removed from, the interior of the furnace.

Disposed within the outer casing is a container consisting of a hollow tube 7 having an inlet pipe 8 leading to it from a point outside the outer casing. A number of containers having this construction may be provided, thus increasing the capacity of the apparatus.

A carbon heating electrode 9 is fitted within the casing and copper pipes 10, 11, 12 and 13 are provided to pass electric current through the carbon electrode and at the same time to allow cooling water to be circulated around each end of the electrode. In addition to the carbon electrode, auxiliary heating means may be fitted to the containers disposed within the outer casing to allow for regulation of the temperature at which the containers are heated.

Temperatures within the outer casing may be continuously monitored by a thermocouple 14 and the whisker product may be removed from the apparatus by removing the end face 2 which is constructed in the form of a lid.

For the production of silicon carbide whiskers in accordance with the present invention, the surfaces of the thermal insulating material 4 near to the reaction zone is advantageously covered with a layer of carbon preferably in a fibrous form.

150 g. of an equimolar silicon/silica mixture are introduced into the container 7 to form a bed 15, and a heavy electric current is passed through the electrode 9 to heat it to about 1550° C. The space within the outer casing and the bed 15 are maintained at atmospheric pressure and are heated by the electrode to about 1450° C., and argon gas then is passed into the inlet tube 8 at a rate of about 0.5 litre/minute and through the bed 15 which is heated to about 1475° C. The argon is preheated before it reaches the bed 15 by interposing carbon granules 16 between the inlet tube 8 and the bed. Silicon monoxide formed in the heated bed 15 is carried by the argon gas into the reaction space enclosed by the outer casing where it mixes, in the presence of a carbon substrate with a mixture of hydrogen and carbon monoxide introduced directly into the reaction space at rates respectively of about 1.5 litres/minute and 50 ml./minute through the inlet tube 5, to form silicon carbide whiskers. The concentration of carbon monoxide in the furnace under these conditions is found to be about 4% by volume of the total gas volume. The gases pass out through the outlet pipe 6.

About 10 g. of silicon carbide whisker product are obtained on the carbon lining of the reaction zone and mullite surfaces 17 after a reaction time of 45 housrs. The product has the appearance of a greenish white, fibrous mass and is found to consist mainly of silicon carbide whiskers having a thickness of between about 1 to 2 microns and a length of up to about 7 cm. The whisker product has a very low density, 1 cubic centimetre of whiskers weighing about one five-hundredths of a gramme.

We claim:
1. A process for the manufacture of silicon carbide whiskers which comprises reacting at a temperature between about 1200° C. and 1600° C. silicon monoxide capour and carbon monoxide in the presence of hydrogen and solid-phase carbon, and providing adjacent these reactants a substrate heated to a temperature above about 1200° C. whereby silicon carbide is formed as whiskers upon the surface of the substrate.

2. A process according to claim 1 in which silicon monoxide and carbon monoxide are present in equimolar proportions.

3. A process according to claim 1 in which hydrogen is present in a molar ratio of at least 2:1 based on the carbon monoxide present.

4. A process according to claim 1 in which the temperature of reaction is 1450° C.

5. A process according to claim 1 in which the substrate temperature is 1375° C.

6. A process according to claim 1 in which the substrate is a refractory material selected from the group consisting of silicon carbide, silicon nitride, alumina, mullite and carbon.

7. A process according to claim 1 and in which the silicon monoxide vapour is evolved by heating a substantially equimolar mixture of silicon and silica at a temperature of at least 1200° C.

8. A process according to claim 7 and in which the evolved silicon monoxide vapour is flushed into contact with the other reactants by a stream of an inert gas.

9. A process according to claim 1 and in which the reaction is carried at a reduced pressure of about 10 torr.

References Cited

UNITED STATES PATENTS 3,246,950    4/1966    Gruber  ---------------- 23—208

FOREIGN PATENTS 1,111,925    5/1968    Great Britain.
1,128,757   10/1968    Great Britain.

ALFRED L. LEAVITT, Primary Examiner
W. E. BALL, Assistant Examiner

U.S. Cl. X.R.

23—208